Figure 1:
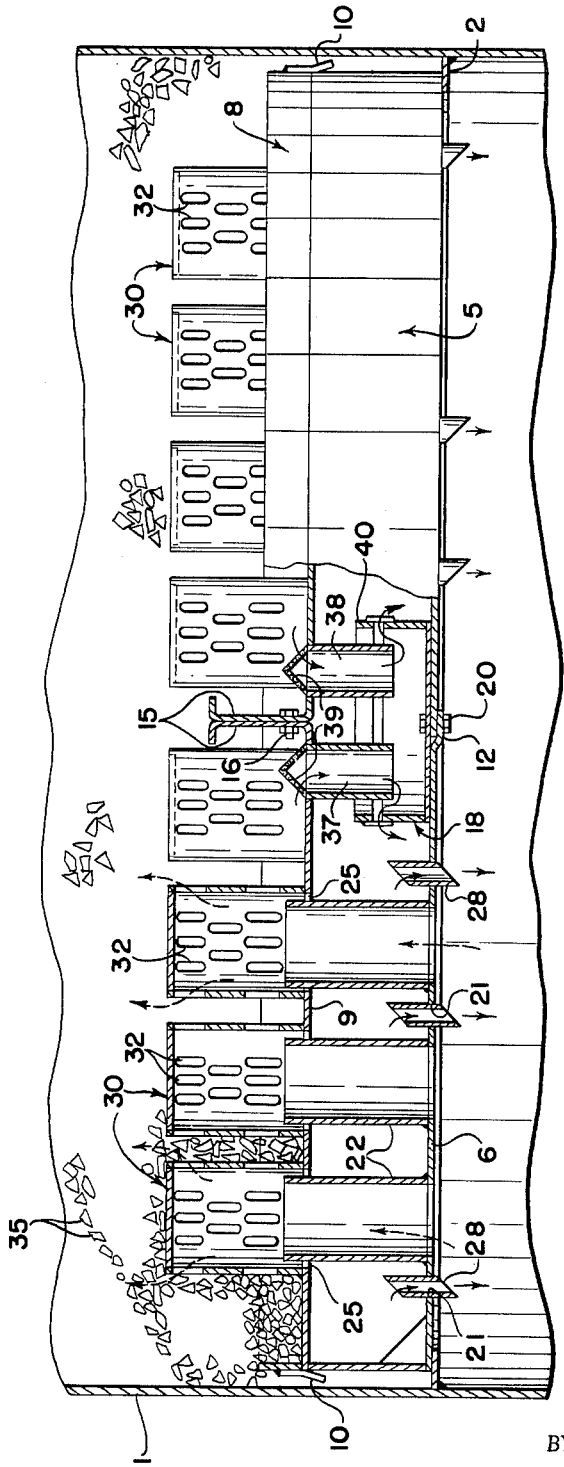

July 5, 1966  C. S. BROWN  3,259,380
TOTAL REDISTRIBUTOR

Filed March 30, 1964  2 Sheets-Sheet 1

INVENTOR.
CHARLES S. BROWN
BY
ATTORNEY

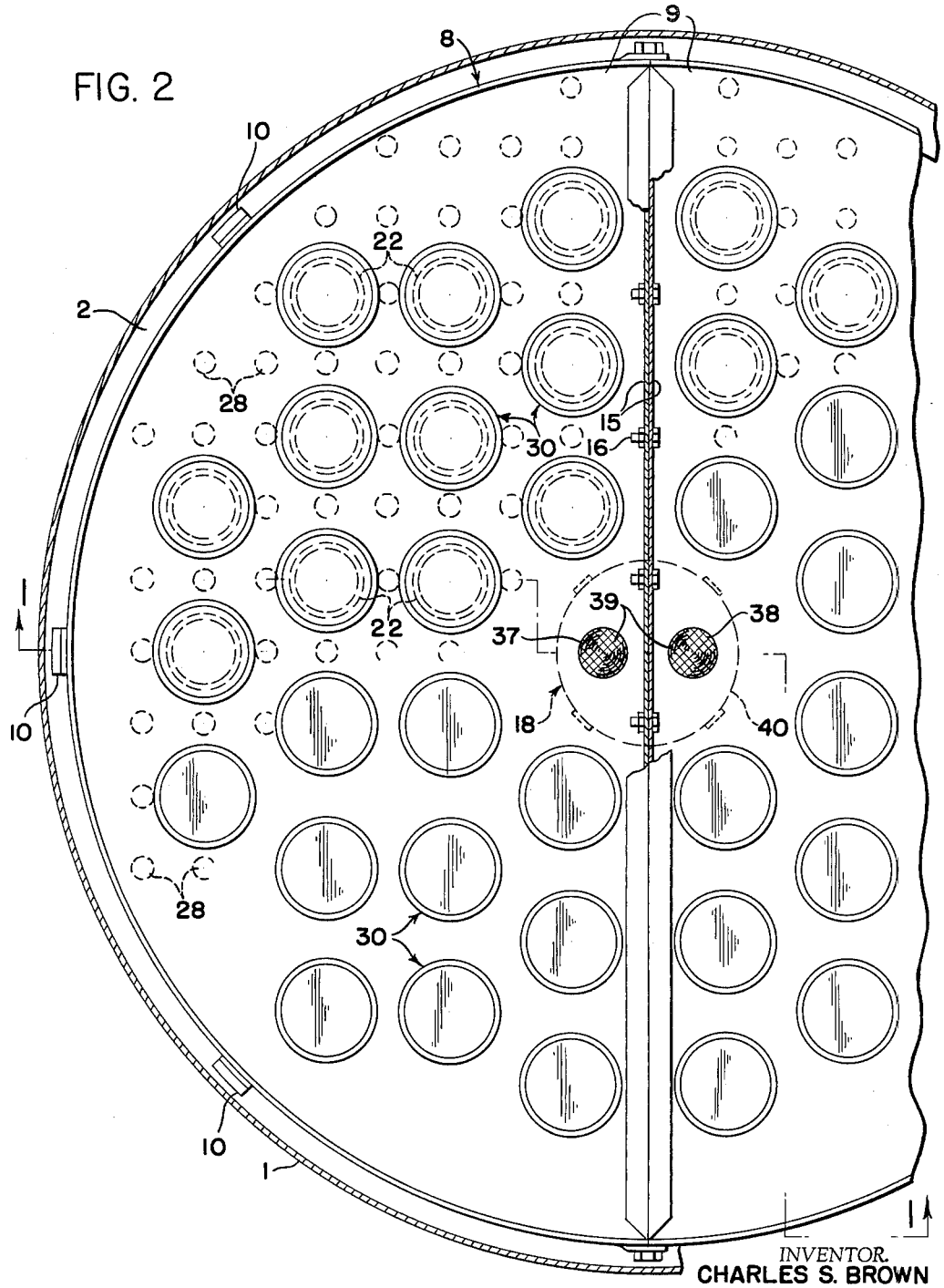

United States Patent Office 3,259,380
Patented July 5, 1966

3,259,380
TOTAL REDISTRIBUTOR
Charles S. Brown, Flushing, N.Y., assignor to The United States Stoneware Company, Tallmadge, Ohio, a corporation of Ohio
Filed Mar. 30, 1964, Ser. No. 355,749
2 Claims. (Cl. 261—97)

This invention relates to a total redistributor for a packed chemical treating tower in which a gas and liquid flow countercurrent to one another. The tower is used in any usual manner to heat or cool a gas or liquid, to chemically interact a gas and a liquid, to transfer a component of a gas to a liquid or a liquid to a gas, etc.

The wall of the tower is usually cylindrical but may be of any desired shape. It may be composed of steel, bricks or other material. The redistributor is supported in the tower by a shelf support or other suitable means. The redistributor comprises a support plate and feed plate which are usually separately constructed and assembled in the tower, although they may be preassembled before reaching the tower. There is a single sump located on the feed plate and means for conveying all of the liquid which collects on the support plate to this sump. The liquid collected in the sump is then supplied on to the feed plate. There are openings distributed substantially uniformly throughout the area of the feed plate to supply the collected liquid over the entire cross section of the tower. This may be done through mere openings in the feed plate, or there may be weirs or nozzles of any suitable type to maintain a constant flow of the liquid which is redistributed. Risers from the feed plate extend to or through openings in the support plate, and are covered by caps the tops of which are solid so that no liquid drains down through them. The walls of these caps are perforated to allow the gas to pass up through the tower, but are so constructed as to prevent liquid from draining down through the openings in the support plate. Usually several redistributors are located at spaced intervals in the tower.

Various means have been suggested for collecting the liquid which descends down through the tower, and redistributing it as by draining the liquid from the tower and then returning it to the tower, but this is expensive. Devices for collecting the liquid from two or more areas of the support plate and distributing these liquids without first mixing them do not as effectively collect and redistribute the liquid as many installations require. The redistributor of the present invention corrects this difficulty.

The liquid flowing down through a packed tower tends to channel through small cross-sectional areas of the bed so that some of the liquid contacts more gas than the balance, and, conversely, some of the gas is more intimately contacted by the liquid than the balance of the gas. Consequently the liquid collected from different portions of the cross-sectional area of the tower differs in composition and/or temperatures, etc. It is only by mixing all of the collected liquid before redistributing it that an efficient operation is maintained. The redistributor of this invention accomplishes this by mixing liquid from all parts of the cross section of a tower in a single sump located within the tower, and redistributing this without withdrawing any of the liquid from the tower and without diluting the collected liquid by addition of other liquid to the tower. This results in a marked increase in the efficiency of the tower.

The redistributor is advantageously formed of two hemicylindrical sections to facilitate its installation in the tower, and these are joined together after being installed. A draw-off from each such section located near the center of the tower drains into a single sump, and the liquid from this sump flows out over the feed plate.

The invention is further described in connection with the accompanying drawings, in which—

FIGURE 1 is a cross section through a tower showing the redistributor in section on line 1—1 of FIGURE 2; and FIGURE 2 is a plan view of a portion of the redistributor.

In the drawings, the tower wall 1 is shown as being composed of sheet metal and it is provided with an annular support flange 2 on which the redistributor rests.

The redistributor is shown as composed of a lower part 5 which is bottomed by the feed plate 6 and an upper part 8 which is bottomed by the support plate 9. Clips 10 guide the support plate as it is located over the feed plate. The redistributor is advantageously assembled by locating the two parts of the bottom portion 5 on the supporting flange 2 with the overlapping straight flange 12 of the one half under the edge of the bottom of the other half. The two halves of the upper part 8 are bolted together. This may be done within the tower, and the upper part 8 is then lowered into place onto the lower part 5. The upper part may be flanged as at 15 to provide strength, and the parts are advantageously bolted together as by the bolts 16. The two halves of the lower part 5 are also advantageously bolted together and the sump 18 may be bolted to the feed plate by the same bolts 20 that are used to hold the two halves of the feed plate together.

There are openings 21 in the feed plate through which the liquid drains down onto the bed of packing elements (not shown) located below the feed plate. Risers 22 surround each of these openings. There is a tight seal between the bottom of each riser and the feed plate which prevents liquid from draining down therethrough. The tops of the risers advantageously extend up through the openings 25 in the support plate 9. FIGURE 1 shows pipe sections 28 beveled at the top, which serve as weirs to maintain a level of liquid on the feed plate and maintain a constant flow of this liquid on to the bed below the feed plate.

Perforated caps 30 are welded to the support plate and enclose the openings 25. The tops are imperforate to prevent liquid from draining down through the openings 25. The perforations 32 in the caps permit the gas to pass up through the tower. The support plate holds the bed of packing elements 35. These elements may be of any desired shape.

There are two downcomers 37 and 38 which drain the liquid from the respective halves of the support plate into the sump 18. Screens 39 cover these openings to prevent the packing elements from falling down through the downcomers. The liquid collects in the sump and flows out onto the feed plate below the spaced riser 40.

In operation the gases pass up through the risers 22 and through the openings 32 in the caps 30 and thence up through the bed. The tops of the caps 30 are imperforate and the sides are perforated. The liquid draining down through the tower collects on the respective halves of the support plate and both halves drain into the single sump 18. Here all of the liquid from the support plate is collected and thoroughly mixed before it is supplied onto the feed plate. From the feed plate the liquid flows through openings onto the bed which is located below it within the tower. Because all of the liquid which collects on the support plate is thoroughly mixed in the sump before it is redistributed across the entire cross section of the tower, the device is properly described as a total redistributor.

If there are more than two sections in the support plate, means is provided for collecting the liquid from each in a single sump for redistribution.

The invention is covered in the claims which follow.

What I claim is:

1. A total redistributor for a packed chemical treating tower, which redistributor includes a support plate extending over substantially the entire cross section of the tower to support the packing, a feed plate below the support plate which extends over substantially the entire cross section of the tower, one sump on the feed plate, a plurality of draw-off means to collect all of the liquid caught on the plate and convey it to the sump so as to mix liquid collected through the different draw-off means before it reaches the feed plate, means for delivering liquid from the sump on to the feed plate, and openings distributed substantially evenly throughout the feed plate to distribute the liquid collected in the sump over the entire cross section of the tower, openings in the support plate covered by cap means with gas-pervious walls which permit gases to pass therethrough and prevent liquid collected on the support plate from draining through the openings therein, and openings in the feed plate and risers surrounding them which conduct gases rising through the feed plate toward the cap means over the openings in the support plate, the top of the gas means being solid to prevent liquid from passing down through the risers.

2. The total redistributor of claim 1 which comprises two hemicylindrical parts joined together at the straight edges thereof, with a straight vertical draw-off adjacent the straight edge of each with one sump collecting liquid from both, with the top of each riser above the support plate, and a weir in each opening in the feed plate to maintain a constant flow of liquid of varying volume from the feed plate.

References Cited by the Examiner

UNITED STATES PATENTS

| 1,475,243 | 11/1923 | Piron | 261—98 |
| 3,006,623 | 10/1961 | Ross et al. | 261—97 X |
| 3,016,234 | 1/1962 | Huppmeier | 261—98 |
| 3,158,171 | 11/1964 | Eckert | 261—95 X |

HARRY B. THORNTON, *Primary Examiner.*

T. R. MILES, *Assistant Examiner.*